(12) United States Patent
Segura

(10) Patent No.: US 7,800,671 B2
(45) Date of Patent: Sep. 21, 2010

(54) PHOTOSENSITIVE CELL BEING ADAPTED TO PROVIDE AN IMAGE VOLTAGE OF A REFERENCE VOLTAGE AND A READING METHOD THEREFOR

(75) Inventor: Josep Segura, Fontaine (FR)

(73) Assignee: STMicroelectronics S.A., Montrouge (FR)

( * ) Notice: Subject to any disclaimer, the term of this patent is extended or adjusted under 35 U.S.C. 154(b) by 1342 days.

(21) Appl. No.: 10/417,584

(22) Filed: Apr. 17, 2003

(65) Prior Publication Data
US 2003/0197797 A1  Oct. 23, 2003

(30) Foreign Application Priority Data
Apr. 17, 2002 (FR) .................................. 02 04805

(51) Int. Cl.
*H04N 3/14* (2006.01)
*H04N 5/16* (2006.01)
*H04N 5/217* (2006.01)

(52) U.S. Cl. ................ 348/300; 348/241; 348/257; 250/208.1

(58) Field of Classification Search .............. 348/302, 348/303, 307–310, 257, 300; 250/208.1; 341/172
See application file for complete search history.

(56) References Cited

U.S. PATENT DOCUMENTS

| | | | | |
|---|---|---|---|---|
| 4,752,741 A | | 6/1988 | Kim et al. | |
| 5,448,056 A | * | 9/1995 | Tsuruta | 250/214 A |
| 5,488,415 A | * | 1/1996 | Uno | 348/241 |
| 5,784,178 A | * | 7/1998 | Tsai et al. | 358/482 |
| 5,796,431 A | | 8/1998 | Yonemoto | |
| 5,886,353 A | * | 3/1999 | Spivey et al. | 250/370.09 |
| 5,959,565 A | * | 9/1999 | Taniuchi et al. | 341/172 |
| 6,201,572 B1 | * | 3/2001 | Chou | 348/241 |
| 6,334,098 B1 | * | 12/2001 | Shefer | 702/189 |
| 6,704,050 B1 | * | 3/2004 | Washkurak et al. | 348/294 |

FOREIGN PATENT DOCUMENTS

TW        1 081 941 A        3/2001

OTHER PUBLICATIONS

French Search Report from French Patent Application 02/04805, filed Apr. 17, 2002.
Patent Abstracts of Japan, vol. 010, No. 228 (E-426), Aug. 8, 1986 & JP 61 062280 A (Seiko Epson Corp.).

* cited by examiner

*Primary Examiner*—David L Ometz
*Assistant Examiner*—Carramah J Quiett
(74) *Attorney, Agent, or Firm*—Lisa K. Jorgenson; James H. Morris; Wolf, Greenfield & Sacks, P.C.

(57) ABSTRACT

A method for reading from a cell of a network of photosensitive cells arranged in rows and in columns, each cell being adapted to providing an image voltage or a reference voltage, including charging, simultaneously for all the cells in the row of the cell, at least one capacitor with a resulting charge which is a function of the difference between a reference current and an image current respectively corresponding to the conversion, by an amplifying factor greater than one, of the reference voltage and of the image voltage, and measuring for the cell column the capacitor charge.

14 Claims, 4 Drawing Sheets

PHOTOSENSITIVE CELL BEING ADAPTED TO PROVIDE AN IMAGE VOLTAGE OF A REFERENCE VOLTAGE AND A READING METHOD THEREFOR

BACKGROUND OF THE INVENTION

1. Field of the Invention

The present invention relates to a photosensitive cell reading method and device.

2. Discussion of the Related Art

FIG. 1 shows an example of a conventional device for reading a photosensitive cell 10 belonging to an array of cells arranged in rows and columns.

Cell 10 is formed of a photosensitive diode 12 having its anode connected to ground GND, and having its cathode connected to the source of a MOS-type N-channel transfer transistor 14. The drain of transistor 14 is connected to the source of a MOS-type N-channel reset transistor 16 having its drain connected to a source of a supply voltage $V_{RT}$.

The gate of transfer transistor 14 is controlled by a voltage $V_{TG}$. The gate of reset transistor 16 is controlled by a voltage $V_R$. The drain of transistor 14 and the source of transistor 16 are connected to the cathode of a transfer diode 18 and to the gate of a transistor 20. Call $V_S$ the voltage at the gate of transistor 20, which is equal to the voltage across diode 18. The anode of diode 18 is connected to ground GND. The drain of transistor 20 is connected to the source of reference voltage $V_{RT}$. The source of transistor 20 is connected to the drain of a read transistor 22. The source of read transistor 22 forms the output of cell 10. The gate of read transistor 22 is controlled by a voltage $V_{READ}$.

The source of transistor 22 is connected to a conductive column track 24. To each column of the array of photosensitive cells is associated a column conductive track which is connected to all cells 10 in the column.

To each column track is associated a read device 30. Read device 30 includes a first capacitor 32 having a terminal connected to ground GND and its other terminal connected to a track of column 24, via a first switch 33, and to the input of a first unity-gain impedance corrector 34. The output of first impedance corrector 34 provides a voltage $V_{35}$ on a first output terminal 35 of device 30.

Device 30 includes a second capacitor 36 having a terminal connected to ground GND and its other terminal connected to column track 24, via a second switch 37, and to the input of a second unity-gain impedance corrector 38. The output of second impedance corrector 38 provides a voltage $V_{39}$ on a second output terminal 39 of device 30.

Switches 33, 37 may be formed of MOS-type transistors operating as switches and having their gates respectively controlled by voltages $V_{11}$ and $V_{12}$. Impedance correctors 34, 38 may be formed of follower-assembled transistors.

A current source 40 is present on column track 24.

FIG. 2 shows a timing diagram of voltages at specific points of FIG. 1, illustrating a conventional method of reading of cell 10 by read device 30. Each step of the process is in fact simultaneously carried out for all the cells 10 in a same row. The read method will be described hereafter for a single cell 10.

On the abscissa axis are shown successive times $t_1$ to $t_8$. On the ordinate axis are shown different variation curves 50 to 56 of voltages at specific points of cell 10 and of read device 30 of FIG. 1.

Curve 50 shows voltage $V_S$ on the gate of transistor 20 and across diode 18. Curve 51 shows voltage $V_R$ applied to the gate of transistor 16. Curve 52 shows control voltage $V_{11}$ of switch 33. Curve 53 shows voltage $V_{TG}$ applied to the gate of transistor 14. Curve 54 shows control voltage $V_{12}$ of switch 37. Curve 55 shows voltage $V_{35}$ on output terminal 35, and curve 56 shows voltage $V_{39}$ on output terminal 39.

Diode 12 is a reverse-biased photosensitive diode. It behaves as a capacitor charged under an initial voltage, which discharges when exposed to a light source, the charge lost by diode 12 being a function of the received light intensity.

All along the read phase, voltage $V_{READ}$ on the gate of transistor 22 is such that transistor 22 behaves as an on switch.

At time $t_1$, voltage $V_R$ switches from a zero value to a positive value. Transistor 16 turns on. Voltage $V_{RT}$ is then applied across diode 18 which, as it is reverse biased, behaves as a capacitor. Voltage $V_S$ on the gate of transistor 20 is then equal to voltage $V_{RT}$.

At time $t_2$, voltage $V_R$ becomes zero again. Transistor 16 is then off. Voltage $V_S$ slightly drops due to a coupling between diode 18 and transistor 16.

At time $t_3$, voltage $V_{11}$ switches from a zero value to a positive value. Switch 33, which used to be off, turns on. Voltage $V_{35}$, corresponding to the voltage across capacitor 32, is then equal to a constant value $V_{REF}$ which is a function of voltage $V_S$.

At time $t_4$, voltage $V_{11}$ switches back to zero and switch 33 turns off. Capacitor 32 keeps between its terminals voltage $V_{REF}$.

At time $t_5$, voltage $V_{TG}$ switches from a zero value to a positive value. Transistor 14 turns on. Diode 18 then discharges into diode 12, which translates as a decrease in voltage $V_S$. This decrease is representative of the amount of light received by diode 12.

At time $t_6$, voltage $V_{TG}$ switches back to zero, and transistor 14 turns off. Voltage $V_S$ at the gate of transistor 20 remains steady.

At time $t_7$, voltage $V_{12}$ switches from a zero value to a positive value. Switch 37, which used to be off, turns on. Voltage $V_{39}$, corresponding to the voltage across capacitor 36, is then equal to a constant voltage $V_{PIX}$ which is a function of voltage $V_S$.

At time $t_8$, voltage $V_{12}$ switches back to zero and switch 37 turns off. Capacitor 36 keeps between its terminals voltage $V_{PIX}$.

Difference $V_U$ between voltages $V_{REF}$ and $V_{PIX}$ is representative of the light intensity received by cell 10. Output terminals 35, 39 are connected to amplifiers or converters (not shown) enabling performing different processings on voltage $V_U$.

The fact of considering voltage $V_u$ to be useful enables suppressing the noise sampled on diode 18 upon disconnection from voltage $V_{RT}$ by transistor 16. Indeed, this noise reappears identically on both transistors $V_{REF}$ and $V_{PIX}$, and is thus suppressed when the difference between these two voltages is calculated to obtain useful voltage $V_U$.

Voltage $V_U$ however includes noise which originates from the read chain including transistors 20, 22, and current source 40. This noise is not suppressed or decreased by the previously-described read process.

Read device 30 is generally directly integrated at the level of the column having a width on the order of some ten micrometers. For want of room, it is not possible to directly include amplifiers in device 30. Said amplifiers must be placed downstream of read circuit 30 and thus amplify all the noises added downstream of read device 30. The presence of amplifiers is all the more necessary as the cell 10 of the type shown in FIG. 1 exhibits a reduced dynamic range since voltage $V_{PIX}$ can only vary between a voltage which depends on the maximum number of charges stored in diode 12 (which is variable according to the manufacturing process of diode 12) and a voltage $V_{REF}$ smaller than $V_{RT}$. Typically, the difference between $V_{REF}$ and $V_{PIX}$ does not exceed 1 volt.

Further, the dissymmetry of impedance correctors 34, 38, results in an offset voltage which can be different for the correctors of the different columns Accordingly, voltages $V_U$, obtained from cells belonging to two different columns having received the same light intensity, may be different. This may translate as the occurrence of vertical bars on an image calculated based on signals $V_U$.

SUMMARY OF THE INVENTION

The present invention aims at providing a method and a device for reading from a cell which does not exhibit the above-mentioned disadvantages.

To achieve this and other objects, the present invention provides a method for reading from a cell of an array of photosensitive cells arranged in rows and columns, each cell being adapted to providing an image voltage or a reference voltage, comprising the steps of:

a) charging, simultaneously for all the cells in the row of said cell, at least one capacitor with a resulting charge which is a function of the difference between a reference current and an image current respectively corresponding to the conversion of the reference voltage and of the image voltage; and b) measuring for the cell column the capacitor charge.

According to another feature of the present invention, step a) comprises the steps, simultaneously carried out for all the cells in the row, of converting the reference voltage into a reference current; charging a capacitor under the reference current for a first determined duration; converting the image voltage into an image current; discharging the capacitor under the image current for a second determined duration.

According to another feature of the present invention, step a) comprises the steps, simultaneously carried out for all the cells in the row, of converting the reference voltage into a reference current; charging a first capacitor under the reference current for a first determined duration; converting the image voltage into an image current; charging a second capacitor under the reference current for a second determined duration; and connecting the first and second capacitors in series.

According to another feature of the present invention, the amplification factor varies according to a setting voltage.

The present invention also provides a device for reading from cells of an array of photosensitive cells arranged in lines and columns, each cell being adapted to providing an image voltage or a reference voltage, comprising for each column a voltage-to-current converter having an input terminal connected to all the column cells and receiving the voltages provided by one of the column cells; and at least one capacitor charged under the current provided by the converter.

According to another feature of the present invention, the device comprises a single capacitor charged or discharged under the current provided by the converter and switching means for connecting a first terminal of the capacitor to an output terminal of the converter and a second terminal of the capacitor to a first voltage, or the first terminal of the capacitor to the first voltage and the second terminal of the capacitor to the output terminal of the converter, according to the voltages received by the converter.

According to another feature of the present invention, the device comprises first and second capacitors and switching means for alternately connecting the first capacitor or the second capacitor to an output terminal of the converter.

According to another feature of the present invention, the voltage-to-current converter comprises a first MOS-type transistor having its drain connected to the input terminal of the converter; second and third MOS-type transistors having their gates connected together to the input terminal, and having their sources connected to a second voltage, the second transistor having its drain connected to the source of the first transistor; a fourth MOS-type transistor having its gate connected, with the gate of the first transistor, to a source of a control voltage, and having its source connected to the drain of the third control transistor; and a current mirror having its input connected to the drain of the fourth transistor and having its output connected to the output terminal of the converter.

According to another feature of the present invention, the second and third transistors operate in a mode in which, for each transistor, for a determined voltage between the gate and the source, the drain current is proportional to the voltage between the drain and the source.

The foregoing object, features, and advantages of the present invention, will be discussed in detail in the following non-limiting description of specific embodiments in connection with the accompanying drawings.

DETAILED DESCRIPTION

Figure 1:
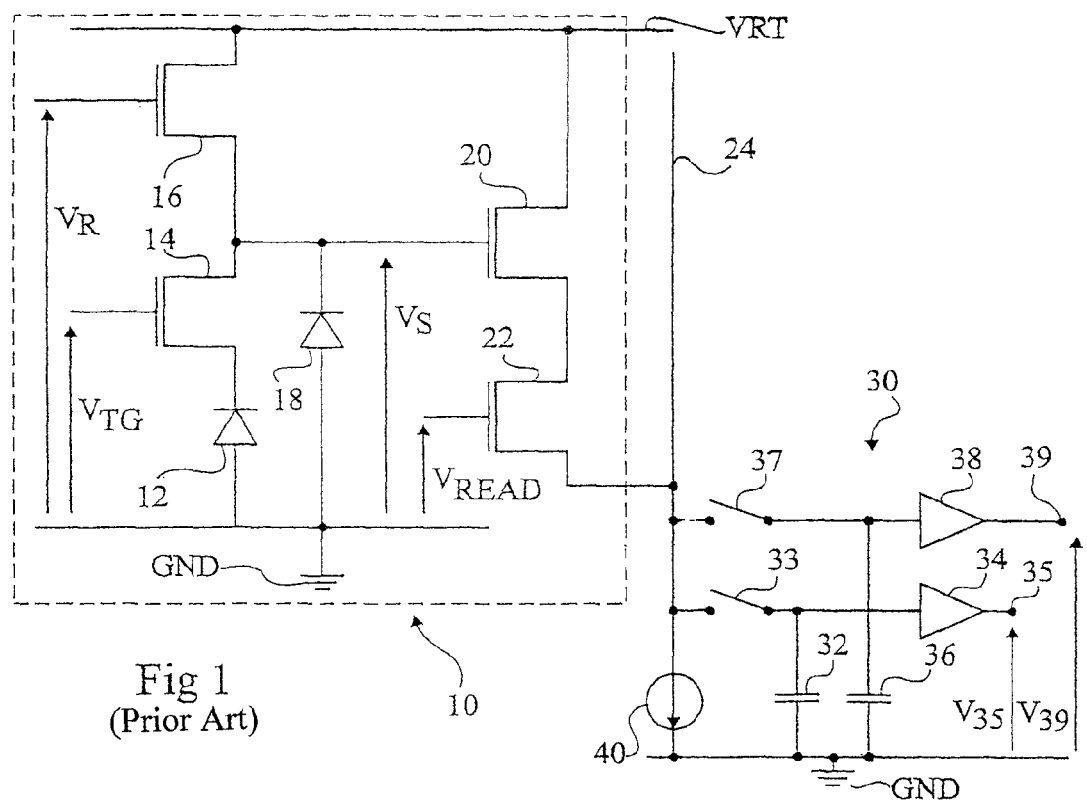
FIG. 1, previously described, shows a conventional photosensitive cell read device.
Figure 3:
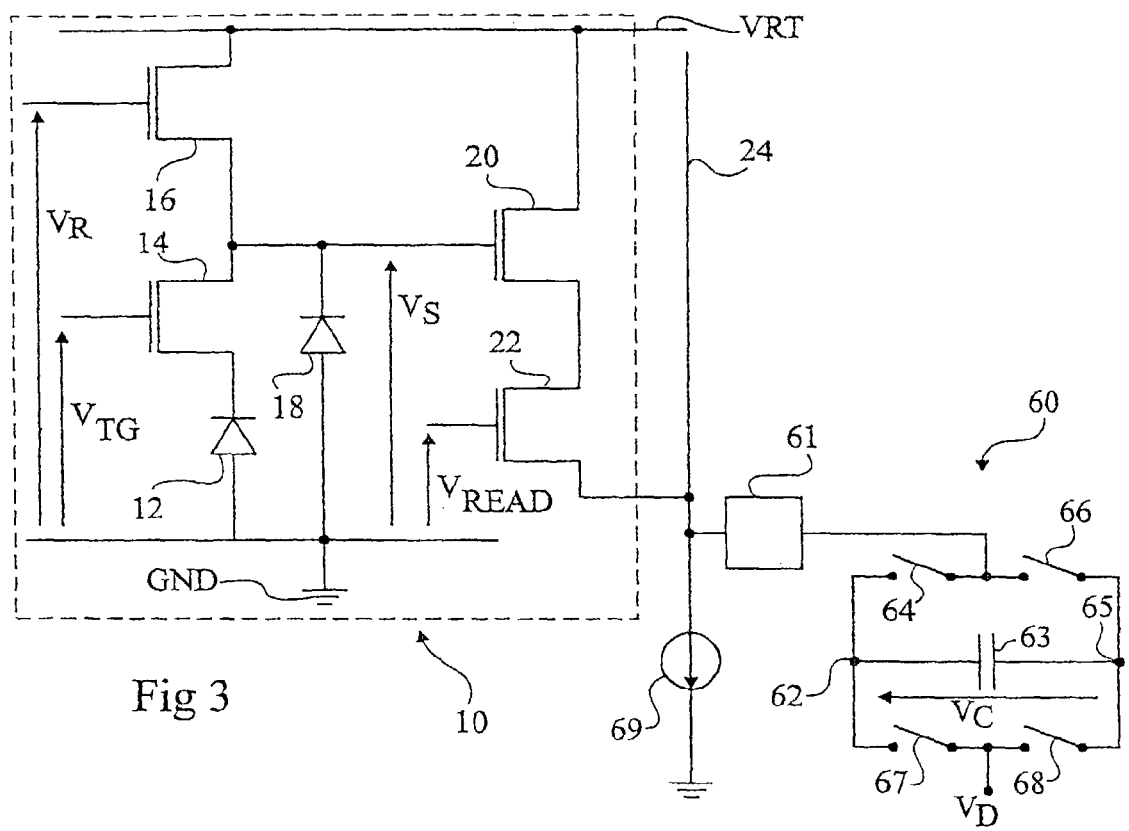
FIG. 3 shows a first embodiment of a cell read device according to the present invention.

FIG. 3 shows a first embodiment of a device 60 according to the present invention for reading from a cell 10, identical to that of FIG. 1. A read device 60 according to the present invention is associated with each column of the photosensitive cell array.

Read device 60 comprises a voltage-to-current converter 61 of gain G having its input connected to column track 24. The output of converter 61 is connected to a first terminal 62 of a capacitor 63, of capacitance C, via a first switch 64, and to second terminal 65 of capacitor 63 via a second switch 66. First terminal 62 of capacitor 63 is connected to a variable voltage source $V_D$ via a third switch 67. Second terminal 65 of capacitor 63 is connected to voltage source $V_D$ via a fourth switch 68. Call $V_C$ the voltage between the first 62 and second 65 terminals of capacitor 63. A current source 69 is placed between the input of converter 61 and ground GND.

Switches 64, 68 are controlled by a voltage $V_1$. They are on when voltage $V_1$ is equal to a determined positive value and off when voltage $V_1$ is zero. Switches 66, 67 are controlled by a voltage $V_2$. They are on when voltage $V_2$ is equal to a determined positive value and off when voltage $V_2$ is zero. Switches 64, 66, 67, 68 each comprise, for example, two complementary MOS-type transistors.

A charge measurement means (not shown) is connected between terminals 62, 65 of capacitor 63 to measure the capacitor charge for a subsequent processing.

Figure 4:
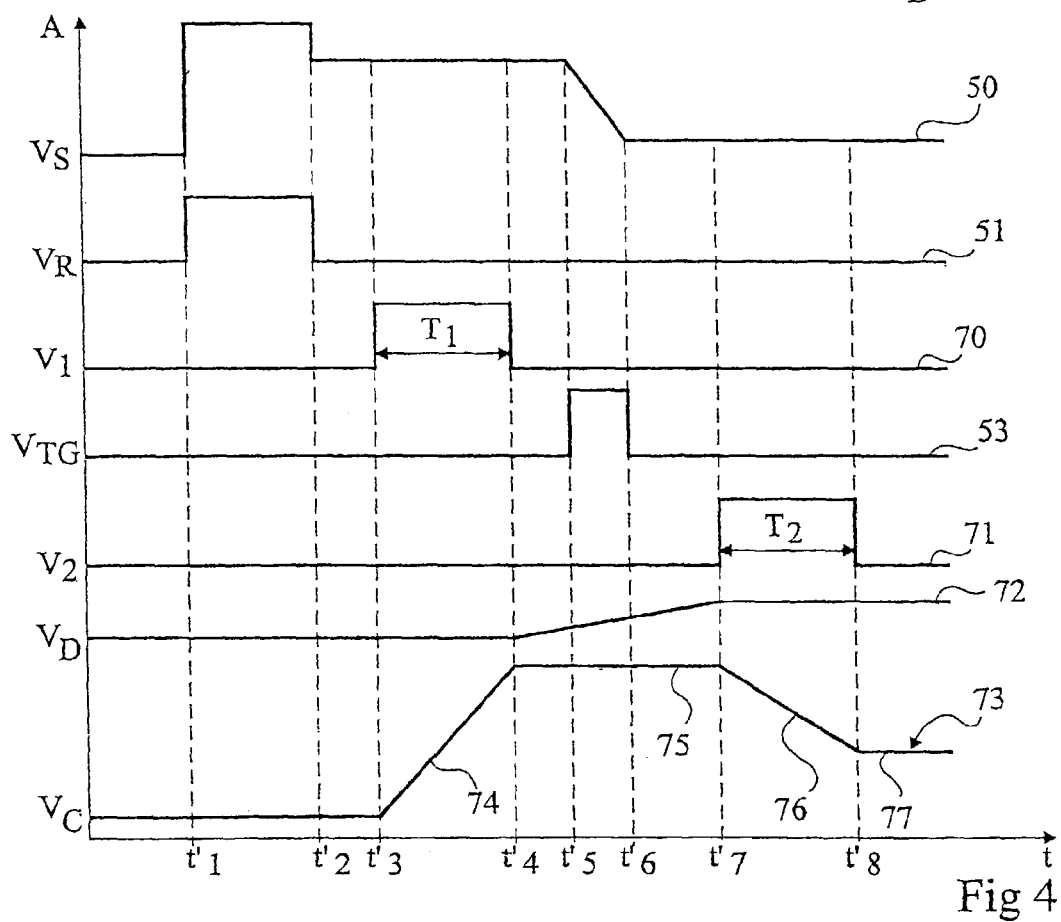
FIG. 4 shows a timing diagram of different voltages illustrating a read method according to the present invention with the device of FIG. 3.

FIG. 4 shows a timing diagram of voltages at specific points of FIG. 3 illustrating the read method according to the first embodiment of the present invention. Each step of the method is in fact performed simultaneously for all cells 10 in a same row. The read method will be described hereafter for a single cell 10.

Successive times $t'_1$ to $t'_8$ are shown on the abscissa axis. On the ordinate axis, curves 50, 51, 53 are identical to those of FIG. 2. Curve 70 shows the variation of control voltage $V_1$ of switches 64 and 68. Curve 71 shows the variation of control voltage $V_2$ of switches 66, 67. Curve 72 shows the variation of voltage $V_D$. Curve 73 shows the variation of voltage $V_C$ across capacitor 63.

Figure 2:
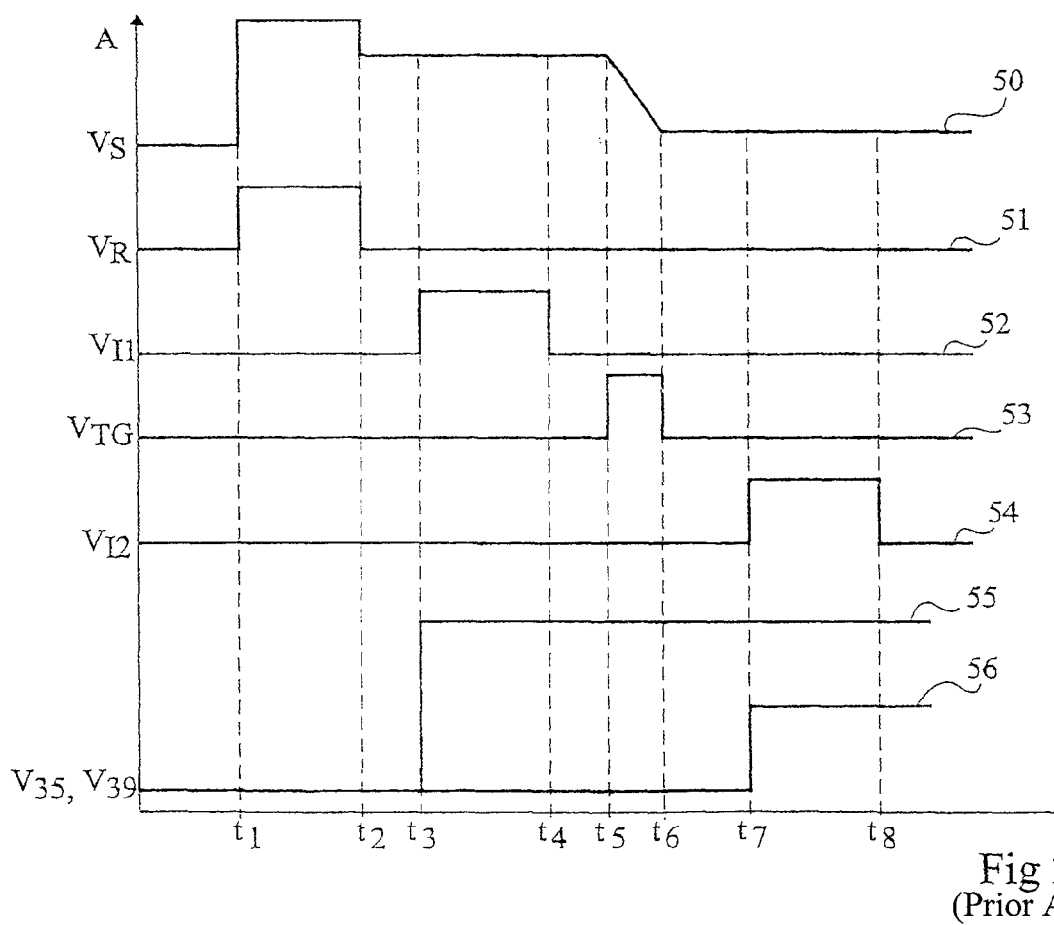
FIG. 2, previously described, shows a timing diagram of different voltages illustrating a conventional method for reading from the cell with the device of FIG. 1.

The variations of voltages $V_S$ and $V_R$ at times $t'_1$ and $t'_2$ are identical to those at times $t_1$ and $t_2$ of FIG. 2.

At time $t'_3$, voltage $V_1$ switches from a zero value to a positive value turning on switches 64 and 68. Voltage $V_2$ remains zero so that switches 66 and 67 remain off. Reference voltage $V_{REF}$, which is a function of the value of voltage $V_S$ at time $t'_3$, is applied to the input of converter 61 and is converted into a current which flows through capacitor 63 of first terminal 62 towards second terminal 65. The current being constant, voltage $V_C$ across capacitor 63 linearly increases, which is shown by section 74 of curve 73.

At time $t'_4$, voltage $V_1$ switches back to zero. Switches 64 and 68 are thus off. Voltage $V_C$ across capacitor 63 remains constant, which is shown by section 75 of curve 73.

At times $t'_5$ and $t'_6$, as previously described, part of the charge of diode 18 is transferred to diode 12, which decreases voltage $V_S$. Between times $t'_4$ and $t'_7$, voltage $V_D$ switches from a zero value to a value $V_{DD}$, to avoid the presence of a negative voltage at the output of converter 61 at time $t'_7$.

At time $t'_7$, voltage $V_2$ switches from a zero value to a positive value, turning-on switches 66, 67. Voltage $V_1$ remains zero so that switches 64 and 68 remain off. Voltage $V_{PIX}$, which is a function of the value of voltage $V_S$ at time $t'_7$, is applied to the input of converter 61 and is converted into a current which flows through capacitor 63 from second terminal 65 to first terminal 62. Since the current is constant, voltage $V_C$ across capacitor 63 linearly decreases, which is shown by section 76 of curve 73.

At time $t'_8$, voltage $V_2$ switches back to zero. Switches 66, 67 are thus off. Voltage $V_C$ across capacitor 63 remains constant, which is shown by section 77 of curve 73.

On section 74, the charge acquired by capacitor 63 is given by the following formula:

$$Q_1 = V_{REF} * G * T_1$$

where $T_1 = t'_4 - t'_3$.

On section 76, the charge lost by capacitor 63 is given by the following formula:

$$Q_2 = V_{PIX} * G * T_2$$

where $T_2 = t'_8 - t'_7$.

After time t'8, the resulting charge of capacitor 63 is equal to:

$$Q_R = V_{REF} * G * T_1 - V_{PIX} * G * T_2$$

In the case where $T_1 = T_2 = T$ one can write:

$$Q_R = G * T * (V_{REF} - V_{PIX})$$

The voltage across capacitor $V_C$ can thus be written as:

$$V_C = (G * T/C) * (V_{REF} - V_{PIX}) = (G * T/C) * V_U$$

In the case where term G*T/C is greater than 1, an amplification of voltage $V_U$ by read device 60 is obtained.

To avoid the dependence of $V_C$ with respect to capacitance C of capacitor 63, which may slightly vary from one column to another, it is preferable to measure the resulting charge $Q_R$ stored in capacitor 63 rather than directly measuring $V_C$. Indeed, resulting charge $Q_R$ is independent from capacitance C. For this purpose, a conventional charge storage measurement means which carries out the transfer of the charge stored in capacitor 63 onto one or several read capacitors is used. The voltage across the read capacitor(s), which will be a function of charge $Q_C$ and of the capacitances of the read capacitors, is finally read. The same read capacitor(s) being used for all columns, the voltage finally read is independent from the non-uniformity of capacitances C of capacitors 63 of each column.

Figure 5:
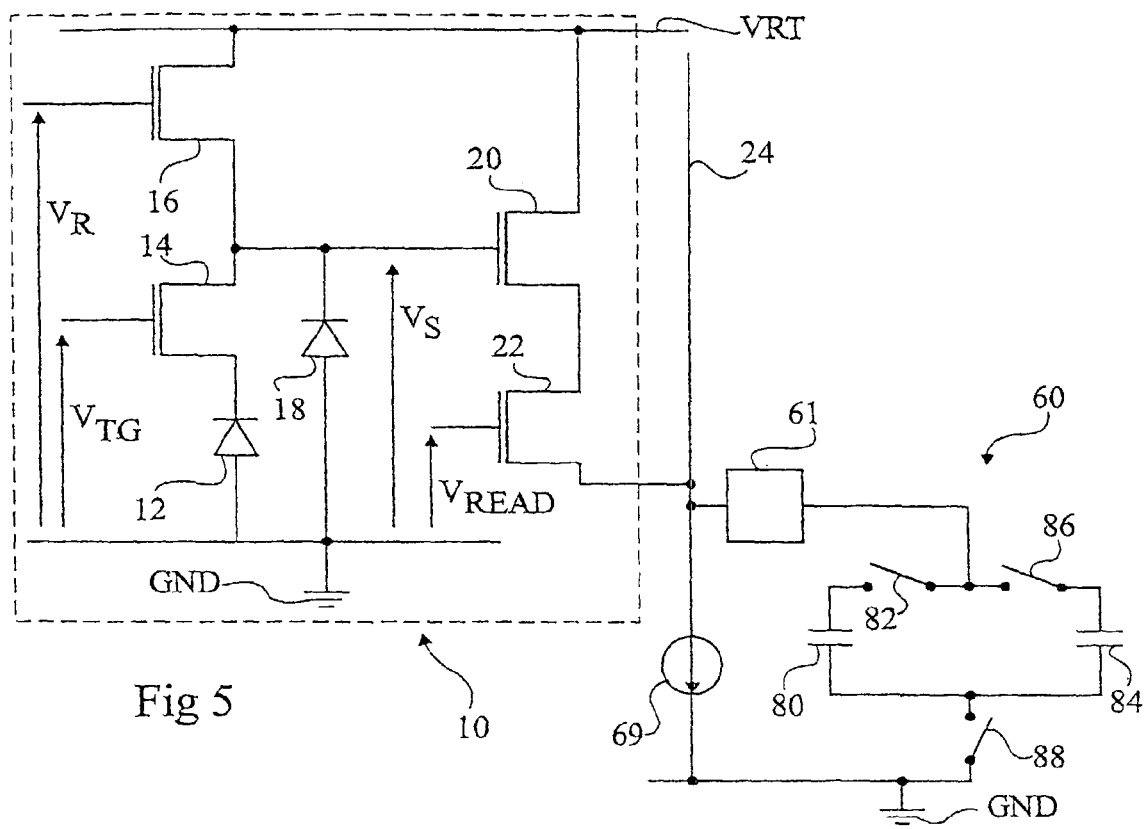
FIG. 5 shows a second embodiment of a cell read device according to the present invention.

FIG. 5 shows a second embodiment of a device 60 according to the present invention for reading from a cell 10.

According to this second mode, the output of voltage-to-current converter 61 is connected to a first terminal of a first capacitor 80, of capacitance $C_1$, via a first switch 82 controlled by a voltage $V_{82}$, and to a first terminal of a second capacitor 84 via a second switch 86 controlled by a voltage $V_{86}$. The second terminals of the first 80 and second 84 capacitors are connected to ground GND via a third switch 88.

Figure 6:
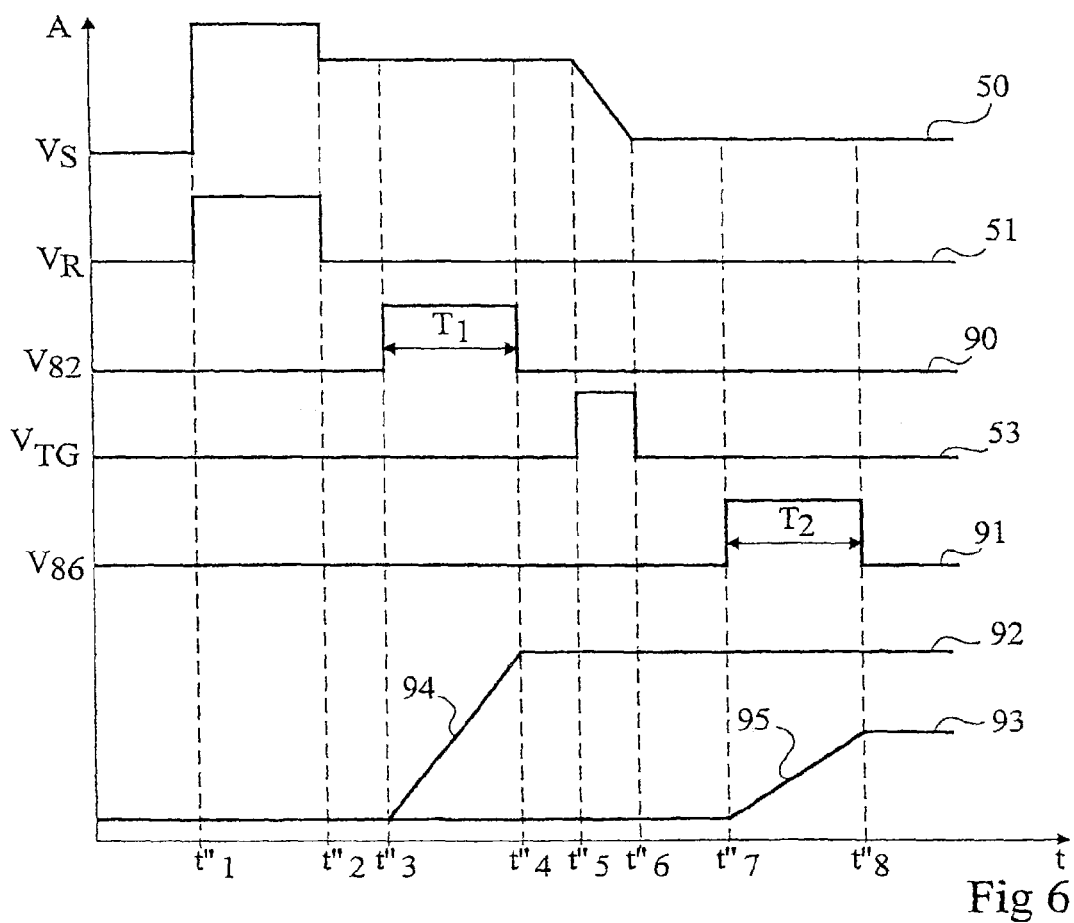
FIG. 6 shows a timing diagram of different voltages illustrating a read method according to the present invention with the device of FIG. 5.

FIG. 6 shows a timing diagram of voltages at specific points of FIG. 5 illustrating the read method according to the second embodiment of the present invention. Each step of the method is in fact carried out simultaneously for all cells 10 in a same row. The read method will be described hereafter for a single cell 10.

Successive times $t''_1$ to $t''_8$ are shown on the abscissa axis. On the ordinate axis, curves 50, 51, 53 are identical to those of FIG. 2. Curve 90 shows the variation of voltage $V_{82}$. Curve 91 shows the variation of voltage $V_{86}$. Curve 92 shows the variation of the voltage across capacitor 80. Curve 93 shows the variation of the voltage across capacitor 84.

From time $t''_1$ to time $t''_8$, switch 88 remains on.

The variations of voltages $V_S$ and $V_R$ at times $t''_1$ and $t''_2$ are identical to those at times $t_1$ and $t_2$ of FIG. 2.

At time $t''_3$, voltage $V_{82}$ switches from a zero value to a positive value turning on switch 82. Voltage $V_{86}$ remains zero so that switch 86 remains off. Reference voltage $V_{REF}$, which is a function of the value of voltage $V_S$ at time $t''_3$, is applied to the input of converter 61 and is converted into a current which flows through capacitor 80. Since the current is constant, the voltage across capacitor 80 increases linearly, which is shown by section 94 of curve 92.

At time $t''_4$, voltage $V_{82}$ switches back to zero. Switch 82 is thus off. The voltage across capacitor 80 remains constant.

At times $t''_5$ and $t''_6$, as previously described, part of the charge of diode 18 is transferred to diode 12, which decreases voltage $V_S$.

At time $t''_7$, voltage $V_{86}$ switches from a zero value to a positive value, turning on switch 86. Voltage $V_{82}$ remains zero, so that switch 82 remains off. Voltage $V_{PIX}$, which is a function of the value of voltage $V_S$ at time $t''_7$, is applied to the input of converter 61 and is converted into a current which flows through capacitor 84. Since the current is constant, the voltage across capacitor 84 increases linearly, which is shown by section 95 of curve 93.

At time $t''_8$, voltage $V_{86}$ switches back to zero. Switch 86 is thus off. The voltage across capacitor 84 remains constant.

The reading is performed by turning off both switches 82, 86 and by turning off switch 88. Capacitors 80, 84 are then arranged in series. The charges balance between capacitors 80, 84, so that the resulting charge on each of the capacitors is linked to the difference between voltages $V_{REF}$ and $V_{PIX}$. The resulting charge can then be read on one of capacitors 80, 84, or on both capacitors, as explained previously.

The device according to the present invention has many advantages.

First, the device according to the present invention enables reducing the noise coming from transistors 20, 22 and from current source 40. Indeed, voltage $V_C$ across capacitor 63 in the first embodiment and across capacitors 80, 84 in the second embodiment corresponds to the integration of a current originating from converter 61. The noise present on voltages $V_{REF}$ and $V_{PIX}$ at the input of converter 61 is thus averaged.

Second, the first embodiment of the device according to the present invention enables reducing the "fixed column noise" originating from the dissymmetry of impedance correctors 34, 38. Indeed, in the present invention, the offset originating from voltage-to-current converter 61 is suppressed or eliminated by the "charge subtraction" operation performed at the level of capacitor 63.

Third, the present invention enables performing an amplification of useful voltage $V_U$ directly at the level of the read device. As an example, for a duration T on the order of 1 μs, a capacitance C of $500*10^{-15}$ F, and a gain G of $10^{-6}$ A/V, an amplification of useful voltage $V_U$ on the order of two is obtained.

Fourth, the present invention enables setting the amplification factor of the read device by modifying gain G of voltage-to-current converter 61, or by modifying durations $T_1$ and $T_2$. Accordingly, the present invention enables, for example, varying the amplification factor according to the cell which is read by the read device. It can thus be envisaged to vary the amplification factor according to the color to be used in the image calculated from useful signal $V_U$.

Fifth, in the first embodiment, one capacitor has been eliminated in device 60 according to the present invention with respect to device 30 of FIG. 1. By forming voltage-to-current converter 61 and current source 69 with a limited number of MOS-type transistors, space gains from 20% to 25% can be obtained.

Figure 7:
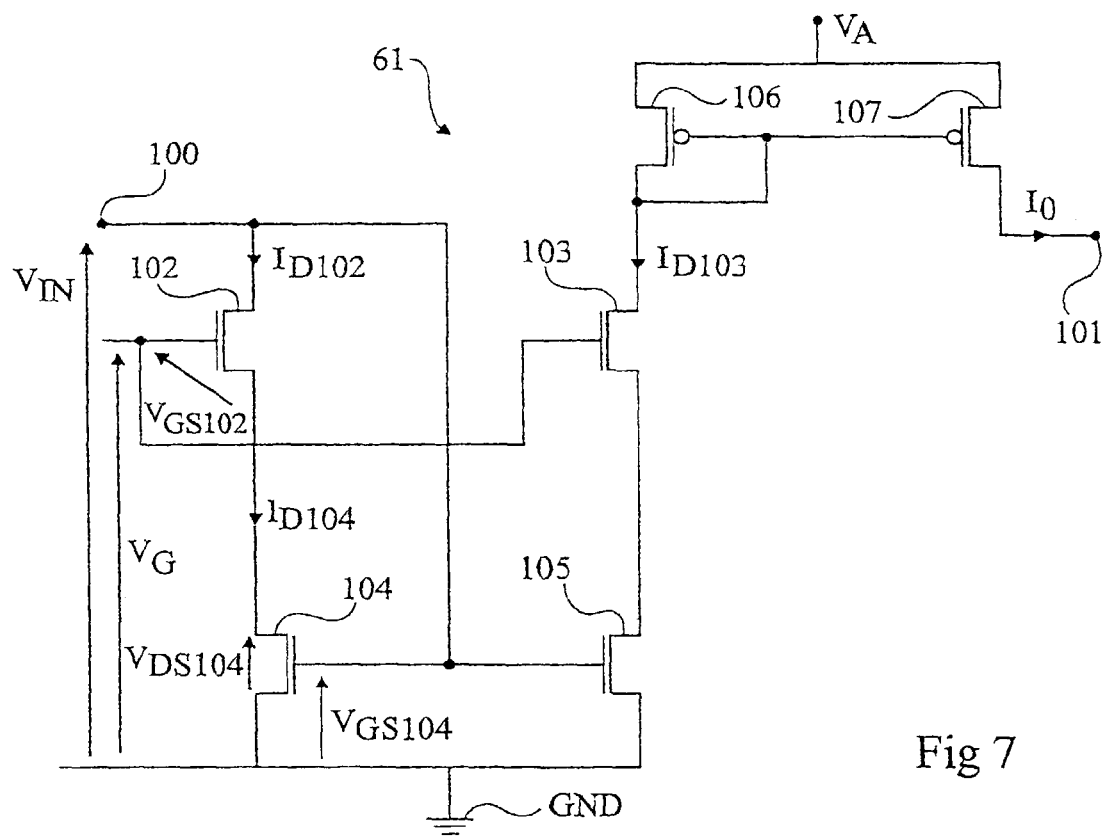
FIG. 7 shows the detail of an element of the devices of FIGS. 3 and 5.

FIG. 7 shows an example of embodiment of voltage-to-current converter 61 and of current source 69 of FIG. 3. Terminal 100 represents the input of converter 61 where a voltage $V_{IN}$ is applied and terminal 101 represents the output of converter 61 which provides a current $I_O$.

Converter 61 comprises two N-channel MOS transistors 102, 103 having their gates controlled by a setting voltage $V_G$. Terminal 100 is connected to the drain of transistors 102. The source of transistor 102 is connected to the drain of an N-channel MOS transistor 104. The source of transistor 103 is connected to the drain of an N-channel MOS transistor 105. The sources of transistors 104, 105 are connected to ground GND. The gates of transistors 104, 105 are connected together to terminal 100.

The drain of transistor 103 is connected to a current mirror which is formed of two P-channel MOS transistors 106, 107. The drain of transistor 106 is connected to the drain of transistor 103. The drain of transistor 107 is connected to output terminal 101. The gates of transistors 106, 107 are connected together to the drain of transistor 106. The sources of transistors 106, 107 are connected to a source of a voltage $V_A$, which may be equal to voltage $V_{RT}$.

The operating principle of converter 61 is the following: transistors 104, 105 operate linearly, that is, for a given voltage between the gate and the source, the drain current is substantially proportional to the voltage between the drain and the source. The drain current $I_{D104}$ of transistor 104 is given by the following expression:

$$I_{D104} = K*(V_{GS104} - V_{TH})*V_{DS104}$$

where $V_{GS104}$ is the voltage between the gate and the source of transistor 104 and $V_{DS104}$ is the voltage between the drain and the source of transistor 104, K is a constant, and $V_{TH}$ a threshold voltage specific to transistor 104. Voltage $V_{GS104}$ is equal to input voltage $V_{IN}$. Voltage $V_{DS104}$ is provided by:

$$V_{DS104} = V_G - V_{GS102}$$

where $V_{GS102}$ is the voltage between the gate and the source of transistor 102. Transistors 102 and 103 operate in saturated mode and $V_{GS102}$ is set by the value of drain current $I_{D102}$ of transistor 102, equal to $I_{D104}$. The value of $V_{GS102}$ varies little, so that $V_{DS104}$ varies little.

Given the circuit symmetry, the drain current of transistor 103 is equal to $I_{D104}$. Transistors 106, 107 forming a current mirror, one obtains:

$$I_O = I_{D103} = K*(V_{GS104} - V_{TH})*V_{DS104} = K*(V_{GS104} - V_{TH})*(V_G - V_{GS102})$$

$$\approx G*V_{GS104} = G*V_{IN}$$

Gain G of converter 61 substantially only depends on setting voltage $V_G$.

Previously-described converter 61 has a particularly simple design and requires a reduced number of MOS-type transistors only. It also enables changing gain G in a simple way by means of setting voltage $V_G$.

Figure 8:
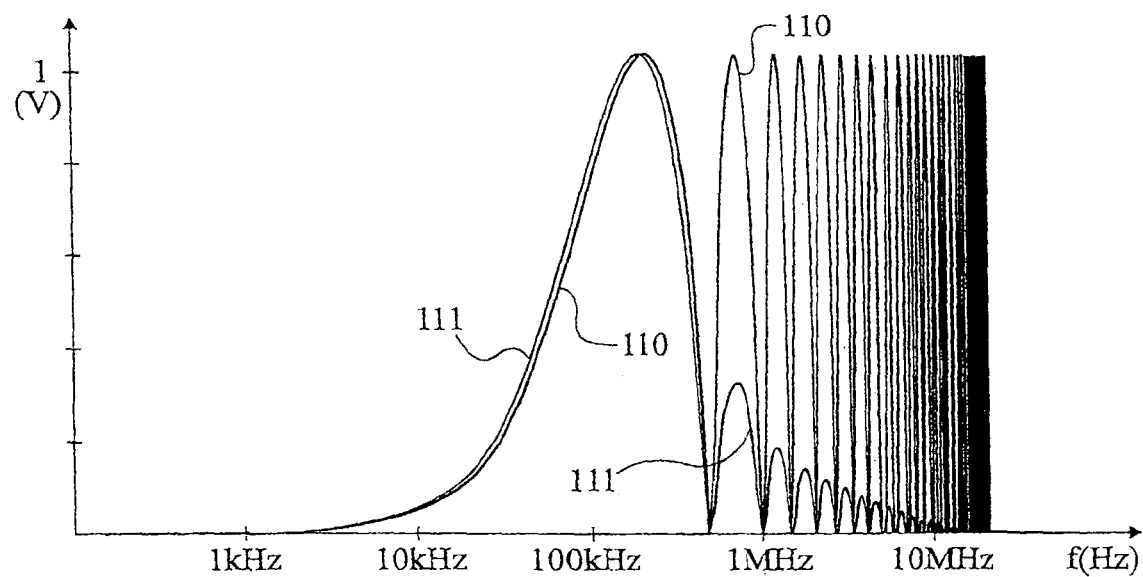
FIG. 8 shows the frequency response of the device of FIG. 3.

FIG. 8 shows the frequency response of the device according to the present invention. Curve 100 shows the standardized output voltage $V_U$ of read device 30 of FIG. 1. Curve 111 shows standardized output voltage $V_C$ of read device 60 according to the present invention.

As appears from FIG. 6, for both curves 110, 111, the output signal is not attenuated at frequencies close to 100 kHz, which may correspond to the usual operating frequencies of read device 30. For curve 110, the signal is not attenuated either at certain frequencies greater than one megahertz, in particular at frequencies of several tens of megahertz which correspond to operating frequencies of the system clock. Conversely, read device 60 according to the present invention also attenuates signals beyond one megahertz.

Of course, the present invention is likely to have various alterations, modifications, and improvements which will readily occur to those skilled in the art. In particular, in the foregoing description, it is possible to arrange the transistors differently to optimize the linearity of the response of converter 61 and/or to minimize the effects of the dispersion of the characteristic of the MOS transistors to avoid fixed noise.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for reading a cell of an array of photosensitive cells arranged in rows and columns, each cell providing, successively, an image voltage and a reference voltage, the method comprising:
   simultaneously, for all the cells in the row of one cell:
   converting the reference voltage into a constant reference current;
   charging a capacitor using the constant reference current for a first duration;
   converting the image voltage into a constant image current; and
   discharging the capacitor using the constant image current for a second duration; and
   for a cell column of the one cell:
   measuring the capacitor charge.

2. The method of claim 1, wherein the voltage-current conversion has an amplification factor which varies according to a setting voltage.

3. A device for reading cells of an array of photosensitive cells arranged in lines and columns, each cell providing, successively, an image voltage and a reference voltage, the device comprising, for each column:
   a voltage-to-current converter having an input terminal connected to all the column cells and receiving the voltages provided by one of the column cells;
   a single capacitor charged or discharged by the current provided by the converter; and
   switching means for connecting a first terminal of the capacitor to an output terminal of the converter and a second terminal of the capacitor to a first voltage, and switching to connect the first terminal of the capacitor to the first voltage and the second terminal of the capacitor to the output terminal of the converter, according to the voltages received by the converter.

4. The device of claim 3, wherein the converter comprises:
   a first MOS-type transistor having its drain connected to the input terminal of the converter;
   second and third MOS-type transistors having their gates connected together to the input terminal, and having their sources connected to a second voltage, the second transistor having its drain connected to the source of the first transistor;
   a fourth MOS-type transistor having its gate connected, with the gate of the first transistor, to a source of a control voltage, and having its source connected to the drain of the third control transistor; and
   a current mirror having its input connected to the drain of the fourth transistor and having its output connected to the output terminal of the converter.

5. The device of claim 4, wherein the second and third transistors operate in a mode in which, for each transistor, for a determined voltage between the gate and the source, the drain current is proportional to the voltage between the drain and the source.

6. A device for reading cells of an array of photosensitive cells arranged in lines and columns, the device comprising:
   a voltage-to-current converter coupled to a cell output terminal, the voltage-to-current converter producing a current;
   a capacitor charged and discharged by the current, the capacitor having first and second terminals; and
   at least one switch that couples the first end of the capacitor to the voltage-to-current converter so that the capacitor is charged by the current, and switches to couple the second end of the capacitor to the voltage-to-current converter so that the capacitor is discharged by the current.

7. The device of claim 6, wherein the at least one switch comprises:
   a first transistor coupled to the voltage-to-current converter and the first terminal of the capacitor; and
   a second transistor coupled to the voltage-to-current converter and the second terminal of the capacitor.

8. The device of claim 7, wherein the at least one switch further comprises:
   a third transistor coupled to the first terminal of the capacitor; and
   a fourth transistor coupled to the second terminal of the capacitor;
   wherein the first and third transistors are turned on when the capacitor is charged by the current;
   wherein the second and fourth transistors are turned on when the capacitor is discharged by the current;
   wherein the first and third transistors are turned off when the capacitor is discharged by the current;
   wherein the second and fourth transistors are turned off when the capacitor is charged by the current.

9. The device of claim 6, wherein the capacitor is a single capacitor.

10. The device of claim 6, wherein the voltage-to-current converter has a gain of greater than one.

11. A method of reading a photosensitive cell, the method comprising:
    receiving a reference voltage from the photosensitive cell, the reference voltage being generated by the photosensitive cell during a period in which the photosensitive cell is not acquiring an image;
    converting the reference voltage into a reference current;
    charging a capacitor using the reference current;
    receiving an image voltage from the photosensitive cell, the image voltage being generated by the photosensitive cell during a period in which the photosensitive cell is acquiring an image;
    converting the image voltage into an image current;
    discharging the capacitor using the image current; and
    after charging and discharging the capacitor, measuring the charge stored by the capacitor.

12. The method of claim 11, wherein the reference current is a constant reference current, and wherein the capacitor is charged by the constant reference current for a determined duration.

13. The method of claim 11, wherein the image current is a constant image current, and wherein the capacitor is discharged by the constant image current for a determined duration.

14. The method of claim 1, wherein the first duration and the second duration are equivalent.

* * * * *